United States Patent [19]

Kulik

[11] Patent Number: 4,770,431

[45] Date of Patent: Sep. 13, 1988

[54] SNAP ON WHEEL CHAIR BICYCLE CONVERTER

[76] Inventor: Helmut Kulik, 169 Green Pond Rd., Rockaway, N.J. 07866

[21] Appl. No.: 82,687

[22] Filed: Aug. 5, 1987

[51] Int. Cl.$^4$ .............................................. B62K 3/16
[52] U.S. Cl. .............................. 280/202; 280/289 WC
[58] Field of Search ............... 280/242 WC, 289 WC, 280/201, 202, 204, 282, 267; 297/DIG. 4

[56] References Cited

U.S. PATENT DOCUMENTS

| D 149,194 | 4/1948 | Larralde | 280/202 |
|---|---|---|---|
| 622,500 | 4/1899 | Kuster | 280/202 |
| 855,979 | 4/1907 | Razoux | 280/202 |
| 1,059,466 | 4/1913 | Hosmer | 280/202 |
| 1,427,417 | 8/1922 | Rickey | 280/202 |
| 1,661,257 | 3/1928 | Kirch | 280/202 |
| 2,482,585 | 9/1949 | Hauptman | 280/202 |

FOREIGN PATENT DOCUMENTS

| 491836 | 1/1930 | Fed. Rep. of Germany | 280/202 |
|---|---|---|---|
| 867683 | 11/1941 | France | 280/202 |
| 367324 | 1/1939 | Italy | 280/202 |
| 474965 | 10/1952 | Italy | 280/202 |

Primary Examiner—John J. Love
Assistant Examiner—Charles R. Watts

[57] ABSTRACT

A device is disclosed for detachably coupling a wheelchair to any bicyle such that they are transportable together as a unit without the need of anything or anyone other than the sole operator of the bicycle. The device allows the bicycle to travel in tandem with the wheelchair without any hindrance on mobility or agility. The device connects the wheelchair to the bicycle via the bicycle's front fork, and the device is substituted as the steering device.

1 Claim, 5 Drawing Sheets

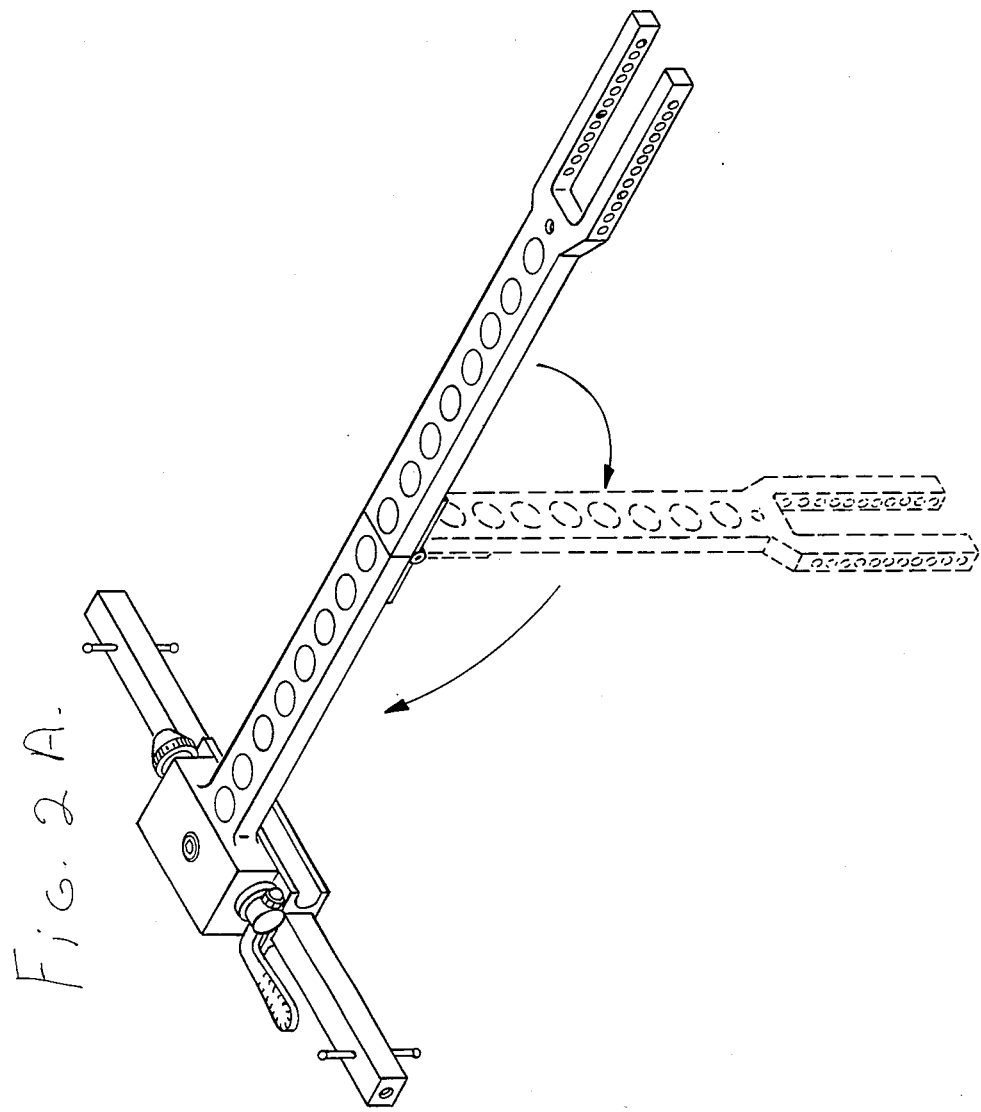

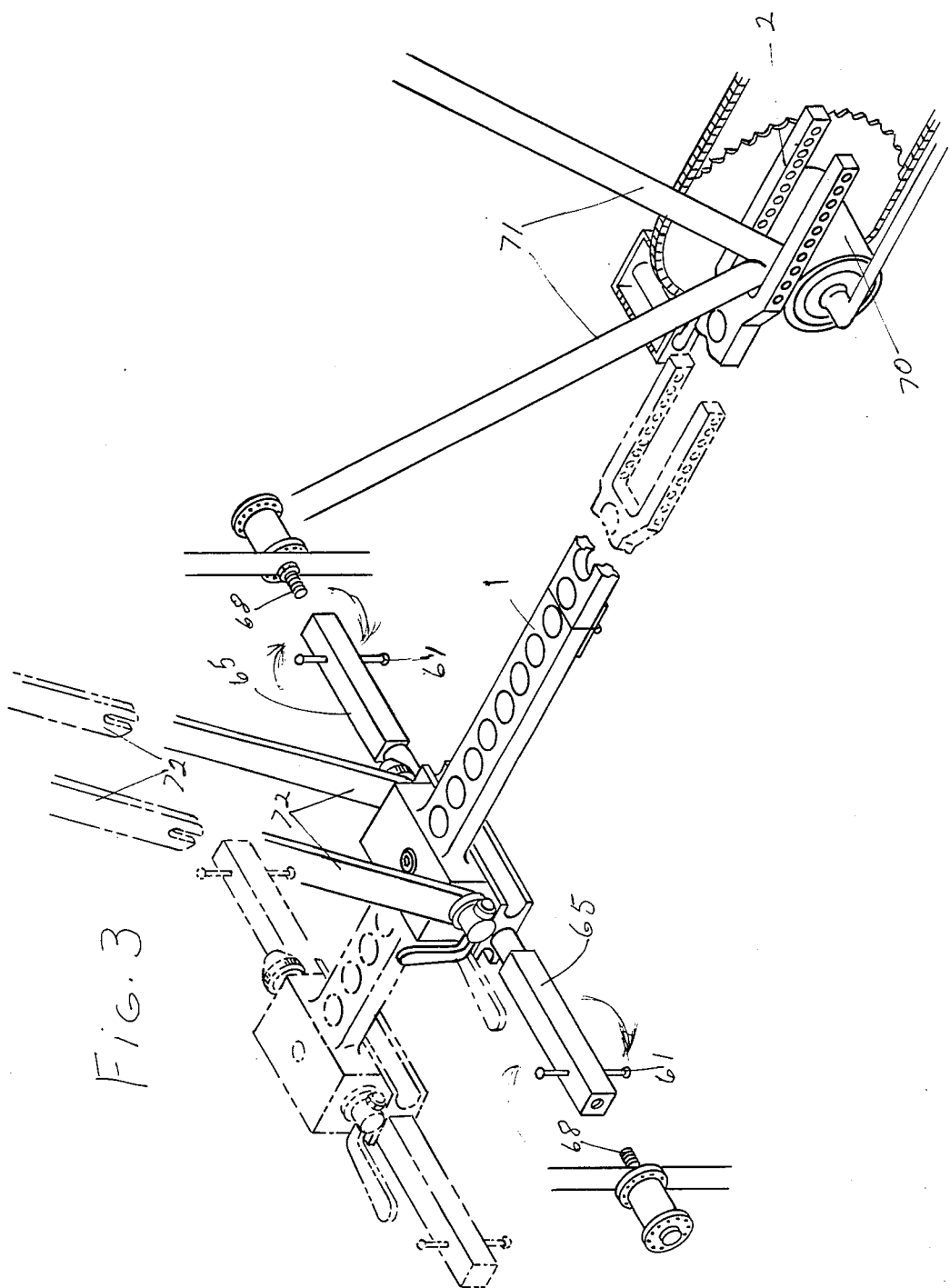

SNAP ON WHEEL CHAIR BICYCLE CONVERTER

BACKGROUND OF THE INVENTION

Field of the Invention

My invention relates to velocipedes, namely bicycles, and wheelchairs, and more particularly for attachments adapted to couple the said bicycle and said wheelchair in order to facilitate the efficiency of a bicycle, and the maneuverability of a wheelchair. The invention may be readily attached and detached without a loss of time, or without a modification to either the said bicycle or the said wheelchair. These and other features and details of the invention are more fully described in the following specification and pointed out in the appended claims.

SUMMARY AND BRIEF DESCRIPTION OF THE DRAWINGS

In the field of non-ambulatory patient care, transportation is accomplished by either locomotion or by the use of an attendant. Both methods are inefficient, and both methods lend themselves to the problem of confining the patient to a very limited area due to fatigue incurred by propelling the wheelchair.

The primary objective of this invention is to provide a device to couple the common adult bicycle to a wheelchair without having to modify either of the two components.

Another objective is to enable ready steering and efficient propulsion of the unit created by the aforementioned coupling.

Another objective is to provide a device that is lightweight for easy carrying and collapsible for easy storage.

Another objective is to provide a device that is easily attachable and detachable so that both components can be easily returned to their original state for the autonomous use of either component.

Another objective of the invention is to provide a device that will totally support a bicycle. buy impose no restrictions on the mobility or agility of the wheelchair.

Another objective is to provide a simplified and durable construction for a manually propelled wheelchair.

Other objectives will appear as the nature of the invention is better understood and the parts hereinafter are more fully described with references to the accompanying drawings in which:

FIG. 1 as a side elevation of the main components of the novel attachment coupling the velocipede and the wheelchair.

FIG. 2A shows how the transitional bracket and fork are folded for easy storage.

FIG. 3 is a side elevation of the components both before (dotted) and after (solid) the bicycle and wheelchair are attached.

Figure 4:
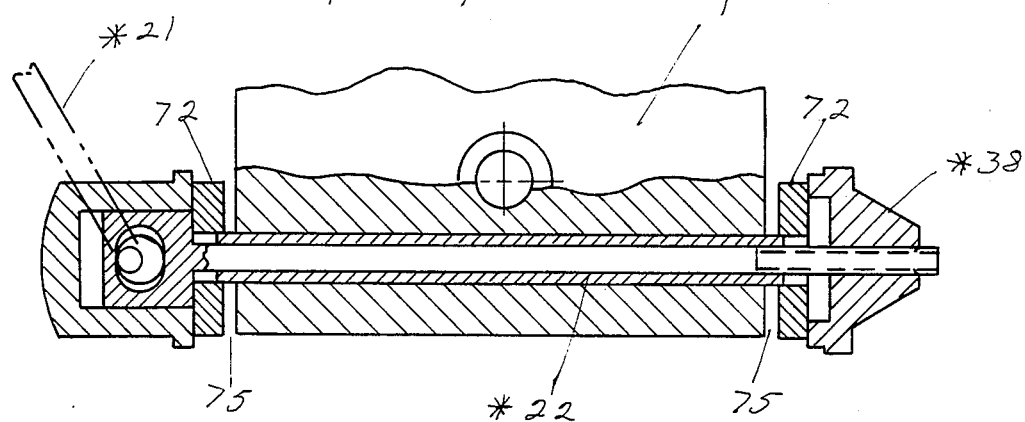
Figure 5:
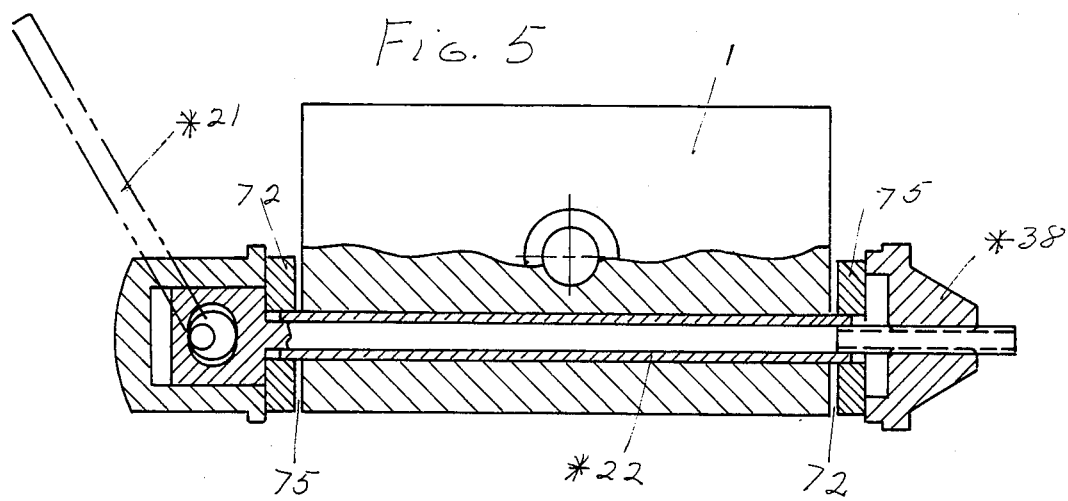
Figure 6:
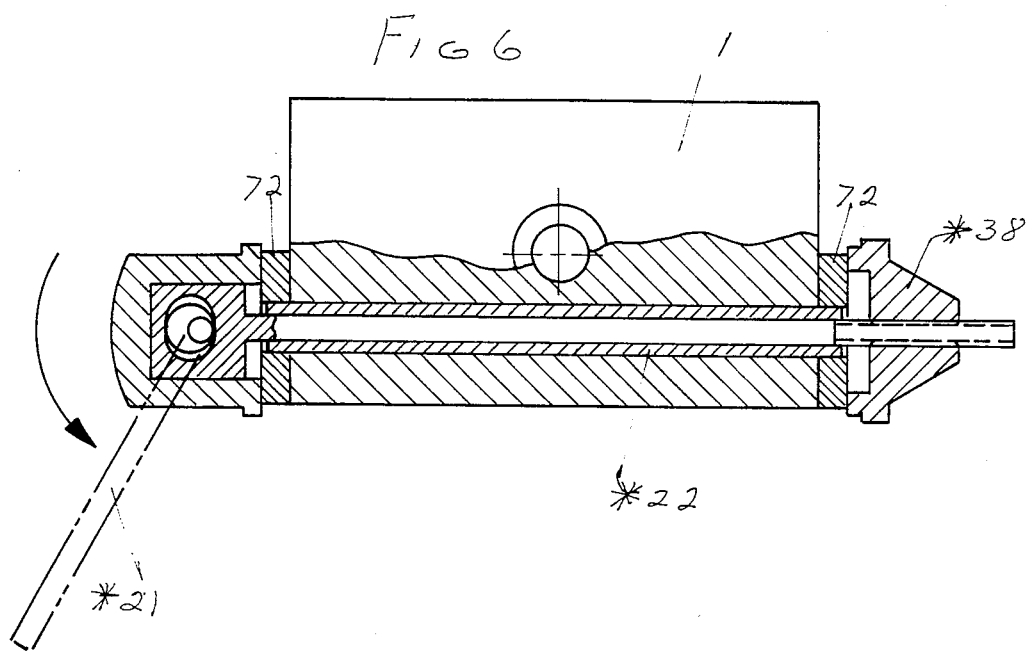

FIGS. 4, 5, and 6 are top cross-sections of the transitional bracket showing the open (FIG. 6) position of the bicycle fork.

DESCRIPTION OF THE PREFERRED EMBODIMENTS

Figure 1:
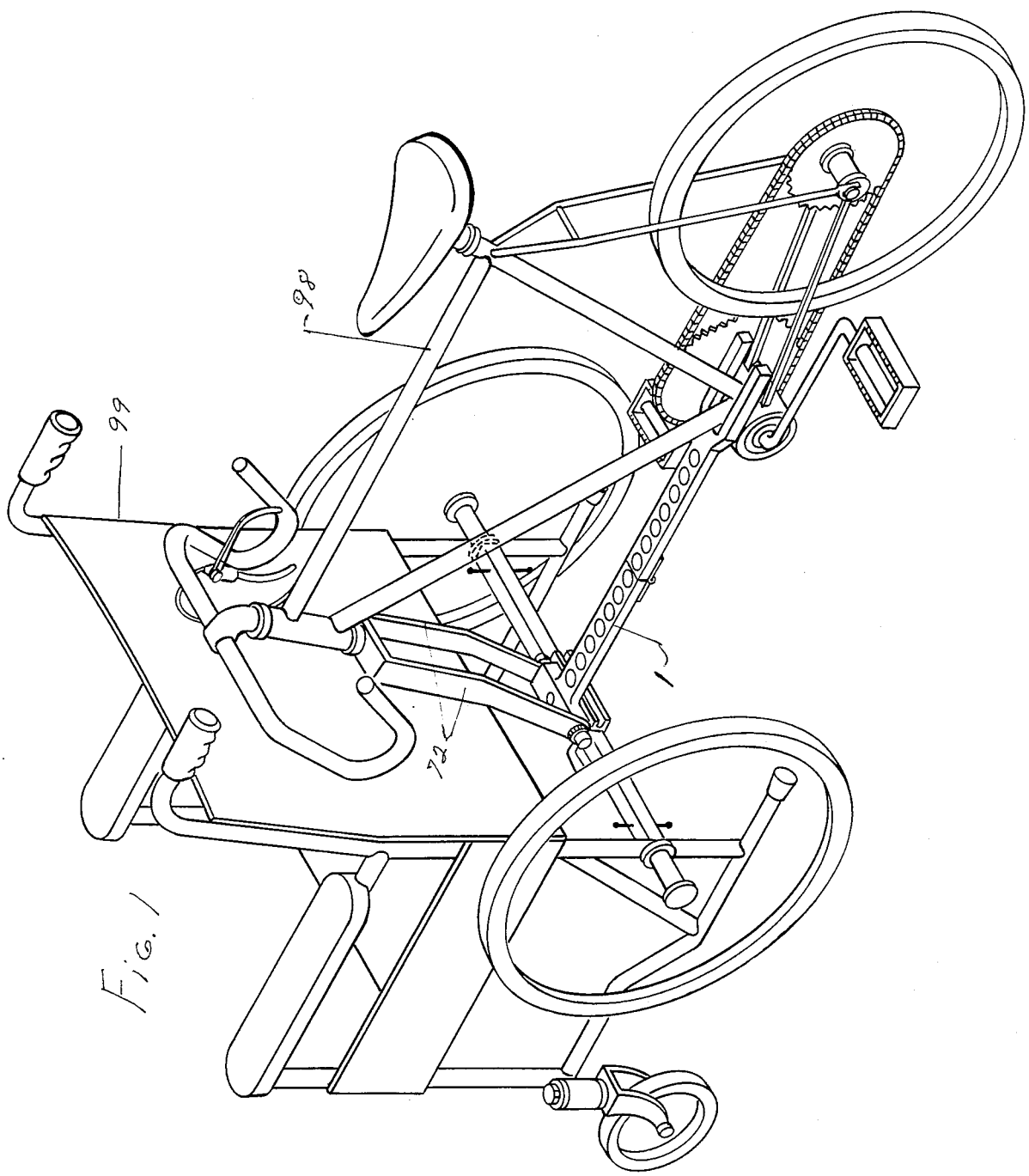

FIG. 1 shows how the Snap On Wheelchair Bicycle Convertor couples the bicycle (98) and the wheelchair (99). It also shows how the bicycle fork (72) is connected to the transitional bracket (1) and how the unit is self supporting.

Figure 2:
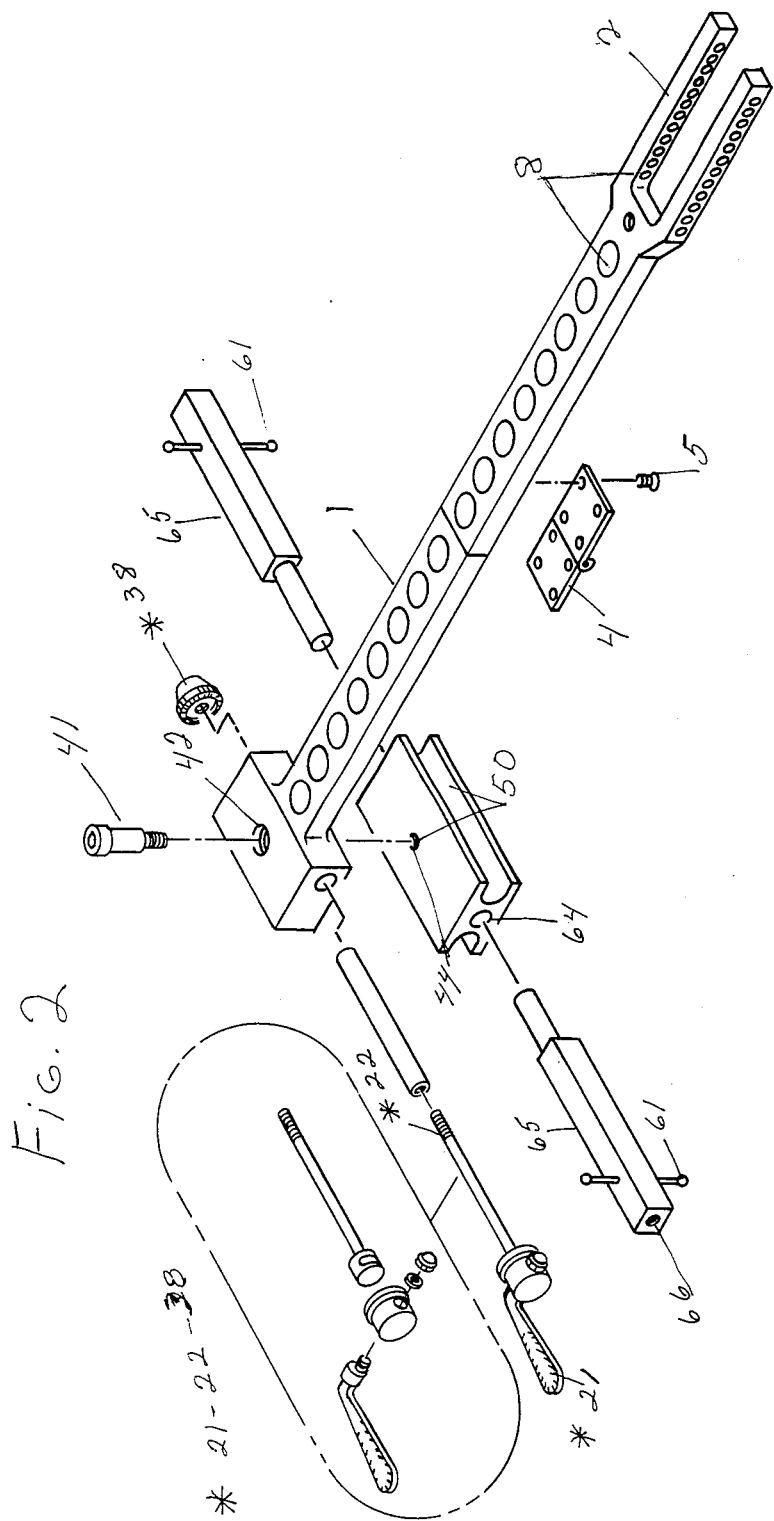
FIG. 2 is a side elevation showing the swivel block.

FIG. 2 shows how the transitional bracket (1) is connected to the swivel block (50) by the shoulder bolt (41), which passes through the shoulder sleeves (42) and into threaded shoulder hole (44). It also shows how the transitional fork (2) is extended to be continuous with the transitional bracket (1) and how they are connected by hinge (4) and hinge screws (5). The turning arms (65) are fitted into the swivel block (50) into the arms sleeves (64). The tightening pins (61) are undetachable from the turning arms (65) onto the spindle (68). The drawings also shows how the bicycle fork (72) is connected to the transitional bracket (1).

FIGS. 4, 5, and 6 shows how the bicycle fork (72) is mounted on the transitional bracket (1) and how it is secured. FIG. 4 shows the quick release (21) in the open position, FIG. 5 in the partially closed position, and FIG. 6 shows the quick release (21) in the locked position.

Having thus described my invention, the objectives set forth are efficiently attained. It is intended that the matter contained in FIGS. 4, 5, and 6 and accompanying drawings shall be interpreted as merely illustrative. The quick release nut (38) are not part of this invention, but they can be used to facilitate the mounting and detaching of the Snap On Wheelchair Bicycle Convertor.

Minor changes may be made without departing from the spirit and scope of the invention as claimed.

What is claimed as new is:

1. A wheelchair and bicycle combination comprising the following:

a bicycle including a steerable front fork, a down tube, a seat tube, a sprocket bearing housing, and a rear wheel;

a wheelchair including left and right rear wheels and left and right rear wheel mounting bars;

and a wheelchair bicycle convertor means including left and right turning arms each with an inner end inserted into a hole in each end of a swivel block and each with an outer end attached to a respective one of the rear wheel mounting bars;

and a transitional bracket with forward and rearward portions hinged together at adjacent inner ends, said forward portion including a forwardly disposed end attached to an upper side of said swivel block by a shoulder bolt, a rearwardly opening fork integral with a distal end of said rearward portion and attached about said down and seat tubes at a point where said down and seat tubes attach to said bearing housing, said forwardly disaposed end being attached between tines of said front forks by a quick-release locking mechanism.

* * * * *